United States Patent
Werner et al.

(10) Patent No.: US 11,551,073 B2
(45) Date of Patent: Jan. 10, 2023

(54) MODULATION DEVICE AND METHOD, ARTIFICIAL SYNAPSE COMPRISING SAID MODULATION DEVICE, SHORT TERM PLASTICITY METHOD IN AN ARTIFICIAL NEURAL NETWORK COMPRISING SAID ARTIFICIAL SYNAPSE

(71) Applicants: COMMISSARIAT A L'ENERGIE ATOMIQUE ET AUX ENERGIES ALTERNATIVES, Paris (FR); INSTITUT NATIONAL DE LA SANTE ET DE LA RECHERCHE MEDICALE, Paris (FR)

(72) Inventors: Thilo Werner, Grenoble (FR); Olivier Bichler, Massy (FR); Elisa Vianello, Grenoble (FR); Blaise Yvert, Saint Egreve (FR)

(73) Assignees: COMMISSARIAT A L'ENERGIE ATOMIQUE ET AUX ENERGIES ALTERNATIVES, Paris (FR); INSTITUT NATIONAL DE LA SANTE ET DE LA RECHERCHE MEDICALE, Paris (FR)

( * ) Notice: Subject to any disclaimer, the term of this patent is extended or adjusted under 35 U.S.C. 154(b) by 747 days.

(21) Appl. No.: 16/465,854

(22) PCT Filed: Dec. 4, 2017

(86) PCT No.: PCT/FR2017/053364
§ 371 (c)(1),
(2) Date: May 31, 2019

(87) PCT Pub. No.: WO2018/100325
PCT Pub. Date: Jun. 7, 2018

(65) Prior Publication Data
US 2019/0303751 A1    Oct. 3, 2019

(30) Foreign Application Priority Data
Dec. 2, 2016    (FR) .................................. 1661847

(51) Int. Cl.
*G06N 3/063* (2006.01)
*G06N 3/04* (2006.01)
*G06N 3/08* (2006.01)

(52) U.S. Cl.
CPC ........... *G06N 3/0635* (2013.01); *G06N 3/049* (2013.01); *G06N 3/088* (2013.01)

(58) Field of Classification Search
CPC ....... G06N 3/049; G06N 3/0635; G06N 3/088
(Continued)

(56) References Cited

U.S. PATENT DOCUMENTS 9,396,431 B2 * 7/2016 Bichler .................. G06N 3/04
2002/0038294 A1 * 3/2002 Matsugu ............. G06V 10/454
706/20

(Continued)

OTHER PUBLICATIONS

R. Naous, M. Al-Shedivat, E. Neftci, G. Cauwenberghs and K. N. Salama, "Stochastic synaptic plasticity with memristor crossbar arrays," 2016 IEEE International Symposium on Circuits and Systems (ISCAS), May 1, 2016, pp. 2078-2081, doi: 10.1109/ISCAS.2016.7538988. (Year: 2016).*

(Continued)

*Primary Examiner* — James D. Rutten
(74) *Attorney, Agent, or Firm* — Pillsbury Winthrop Shaw Pittman LLP

(57) ABSTRACT

A modulation device includes at least one memristive device, and a control block, the modulation device having an equivalent conductance $y_i(t)$ produced by the at least one memristive device and the control block being configured to receive a clock signal and perform a first modification of the equivalent conductance $y_i(t)$ upon receipt of each clock (Continued)

signal, receive an input voltage pulse and perform a second modification of the equivalent conductance $y_i(t)$ upon receipt of each input voltage pulse, the first and second modifications being in opposite directions.

9 Claims, 3 Drawing Sheets

(58) Field of Classification Search
USPC .......................................................... 706/25
See application file for complete search history.

(56) References Cited

U.S. PATENT DOCUMENTS

| | | | | |
|---|---|---|---|---|
| 2010/0277232 | A1* | 11/2010 | Snider .................... | G06N 3/063 327/565 |
| 2012/0011088 | A1* | 1/2012 | Aparin .................... | G06N 3/02 706/33 |
| 2012/0117012 | A1* | 5/2012 | Szatmary ................. | G06N 3/10 706/27 |
| 2013/0328416 | A1* | 12/2013 | Whitworth .............. | H02J 50/20 307/149 |
| 2014/0129498 | A1* | 5/2014 | Bichler .................. | G06N 3/063 706/25 |
| 2014/0172762 | A1* | 6/2014 | Suri ....................... | G06N 3/049 706/25 |
| 2014/0330761 | A1* | 11/2014 | Kim ....................... | G06N 3/063 706/25 |

OTHER PUBLICATIONS

A. Singha, B. Muralidharan and B. Rajendran, "Analog memristive time dependent learning using discrete nanoscale RRAM devices," 2014 International Joint Conference on Neural Networks (IJCNN), 2014, pp. 2248-2255, doi: 10.1109/IJCNN.2014.6889915. (Year: 2014).*

International Search Report as issued in International Patent Application No. PCT/FR2017/053364, dated Feb. 28, 2018.

Garbin, D., et al., "Variability-tolerant convolutional neural network for pattern recognition applications based on OxRAM synapses," IEDM (2014), 4 pages.

Werner, T., et al., "Real-time decoding of brain activity by embedded Spiking Neural Networks using OxRAM synapses," ISCAS (2016), pp. 2318-2321.

Suri, M., et al., "Phase change memory as synapse for ultra-dense neuromorphic systems: application to complex visual pattern extraction," IEDM (2011), 4 pages.

Palma, G., et al., "Stochastic neuron design using Conductive Bridge RAM," Proceedings of the 2013 IEEE/ACM International Symposium on Nanoscale Architectures (NanoArch'13), Jul. 2013, XP032498569, pp. 95-100.

Werner, T., et al., "Spiking Neural Networks Based on OxRAM Synapses for Real-Time Unsupervised Spike Sorting," Frontiers in Neuroscience, vol. 10, 474, Nov. 2016, XP055342017, pp. 1-12.

Suri, M., et al., "Bio-Inspired Stochastic Computing Using Binary CBRAM Synapses," IEEE Transactions on Electron Devices, vol. 60, No. 7, Jul. 2013, XP011515274, pp. 2402-2409.

Werner, T., et al., "Experimental Demonstration of Short and Long Term Synaptic Plasticity Using OxRAM Multi k-bit Arrays for Reliable Detection of Highly Noisy Input Data," Proceedings of the 2016 IEEE International Electron Devices Meeting (IEDM'16), Dec. 2016, XP033054995, 4 pages.

Bichler, O., et al., "Visual Pattern Extraction Using Energy-Efficient "2-PCM Synapse" Neuromorphic Architecture," IEEE Transactions on Electron Devices, vol. 59, No. 8, Aug. 2012, XP011453738, pp. 2206-2214.

Chicca, E., et al., "Neuromorphic Electronic Circuits for Building Autonomous Cognitive Systems," Proceedings of the IEEE, vol. 102, No. 9, Sep. 2014, XP011556825, pp. 1367-1388.

\* cited by examiner

//MODULATION DEVICE AND METHOD, ARTIFICIAL SYNAPSE COMPRISING SAID MODULATION DEVICE, SHORT TERM PLASTICITY METHOD IN AN ARTIFICIAL NEURAL NETWORK COMPRISING SAID ARTIFICIAL SYNAPSE

CROSS REFERENCE TO RELATED APPLICATIONS

This application is the U.S. National Stage of PCT/FR2017/053364, filed Dec. 4, 2017, which in turn claims priority to French Patent Application No. 1661847 filed Dec. 2, 2016, the entire contents of all applications are incorporated herein by reference in their entireties.

TECHNICAL FIELD OF THE INVENTION

The technical field of the invention is that of artificial neural networks, or neuromorphic circuits. The present invention relates to a modulation device and method, as well as an artificial synapse comprising said modulation device and a short term plasticity method in an artificial neural network comprising said artificial synapse. An application field of the present invention is notably signal processing, for example image processing or neural signal processing.

TECHNOLOGICAL BACKGROUND OF THE INVENTION

Generally speaking, an artificial neural network comprises a plurality of artificial neurons and a plurality of artificial synapses. Each artificial synapse ensures a connection between two artificial neurons. Each artificial neuron is connected to a plurality of other artificial neurons.

Each artificial synapse typically has an electrically adjustable conductance and a synaptic weight proportional to its conductance. Each artificial neuron typically has a potential, also called membrane potential or transmembrane potential. When an artificial synapse transmits a pulse to an artificial neuron, the potential of the artificial neuron is modified as a function of the synaptic weight of the artificial synapse. For example, in the case of an excitatory artificial synapse, the greater the synaptic weight, the more the potential of the artificial neuron increases. Conversely, in the case of an inhibitory artificial synapse, the greater the synaptic weight, the more the potential of the artificial neuron decreases.

If a given artificial synapse is considered, connecting a first artificial neuron to a second artificial neuron, "presynaptic pulse" is taken to mean a pulse emitted by the first artificial neuron and transmitted by said artificial synapse to the second artificial neuron, and "postsynaptic pulse" is taken to mean a pulse emitted by the second artificial neuron. In this case, the first artificial neuron is also called presynaptic neurone, and the second artificial neuron is also called postsynaptic neuron.

Several studies have focused on implementing an LTP (long term plasticity) mechanism for artificial synapses. According to this mechanism, the synaptic weight of an artificial synapse is modified as a function of the pulses emitted by the postsynaptic neuron:

if, shortly before the emission of the postsynaptic pulse, the presynaptic neurone has emitted a pulse, then the synaptic weight of the artificial synapse increases; otherwise, the synaptic weight of the artificial synapse decreases.

Such a mechanism contributes in fact to enabling unsupervised learning of the artificial neural network. "Learning" is generally taken to mean the fact that the artificial neural network learns to process different types of input patterns, while converging towards a final state specific to each type of input pattern. Learning is designated "unsupervised" when the artificial neural network, from a pattern that is presented to it, is not forced to converge towards a precise final state but is left free to converge towards any final state.

The articles entitled "Variability-tolerant convolutional neural network for pattern recognition applications based on OxRAM synapses" (D. Garbin et al., IEDM 2014) and "Real-time decoding of brain activity by embedded Spiking Neural Networks using OxRAM synapses" (T. Werner et al., ISCAS 2016) have for example described the implementation of a long term plasticity LTP mechanism for artificial synapses produced by means of non-volatile resistive memories each having only two distinct resistive states. The articles entitled "Phase change memory as synapse for ultra-dense neuromorphic systems: application to complex visual pattern extraction" (M. Suri et al., IEDM 2011) and "Visual pattern extraction using energy-efficient "2-PCM Synapse" neuromorphic architecture" (O. Bichler et al., TED 2012) have for their part described the implementation of a long term plasticity LTP mechanism for artificial synapses produced by means of non-volatile resistive memories each having at least three distinct resistive states.

Known artificial neural networks are however sensitive to noise. They have in fact a tendency, when the input patterns are noisy, to "learn from noise", which degrades their performances.

SUMMARY OF THE INVENTION

The invention advantageously contributes to enabling unsupervised learning of an artificial neural network while improving the robustness to noise of said artificial neural network.

A first aspect of the invention relates to a modulation device comprising:

at least one memristive device, and
a control block, the modulation device having an equivalent conductance $y_i(t)$ produced by the at least one memristive device, and the control block having means for:

receiving a clock signal and carrying out a first modification of the equivalent conductance $y_i(t)$ upon receipt of each clock signal,
receiving an input voltage pulse and carrying out a second modification of the equivalent conductance $y_i(t)$ upon receipt of each input voltage pulse, the first and second modifications being in opposite directions.

The at least one memristive device and the control block of the modulation device are connected together such that the control block is configured to modify the equivalent conductance of the at least one memristive device. The control block has a first input configured to receive a first type of signal and a second input configured to receive a second type of signal: the first type of signal is a clock signal and the second type of signal is an input voltage pulse. The means of the control block modify an equivalent conductance value $y_i(t)$ as a function of the first and second types of signals received on the first and second inputs of the control block.

The modulation device according to the first aspect of the invention is advantageously able to implement a STP (Short Term Plasticity) mechanism.

Apart from the characteristics that have been evoked in the preceding paragraph, the modulation device according to the first aspect of the invention may have one or more complementary characteristics among the following, considered individually or according to all technically possible combinations thereof:

The first modification in absolute value is preferentially strictly less than the second modification in absolute value.

The means of the control block for carrying out the first modification of the equivalent conductance $y_i(t)$ include means for emitting a pulse of a first type destined for the at least one memristive device, and the means of the control block for carrying out the second modification of the equivalent conductance $y_i(t)$ include means for emitting a pulse of a second type destined for the at least one memristive device. The control block is thereby able to emit only two distinct types of pulses, which simplifies the associated electronics.

The at least one memristive device is preferentially a CBRAM device or an OxRAM device.

The modulation device comprises a plurality of memristive devices producing the equivalent conductance $y_i(t)$ and the means of the control block for carrying out the first and second modifications of the equivalent conductance $y_i(t)$ include means for receiving an instruction from a pseudo random number generator.

The modulation device comprises a plurality of memristive devices producing the equivalent conductance $y_i(t)$ and the means of the control block for carrying out the first and second modifications of the equivalent conductance $y_i(t)$ include means for emitting pulses destined for the plurality of memristive devices in such a way that the plurality of memristive devices are placed in a particular operating mode in which they have an internal stochasticity, said pulses being determined by choosing a combination of the following parameters:
pulse width,
pulse rise and pulse decay times,
pulse amplitude.

A second aspect of the invention relates to an artificial synapse comprising a modulation device according to any of the preceding claims.

A third aspect of the invention relates to an artificial neural network comprising at least one first artificial neuron able to emit an input voltage pulse and connected to a second artificial neuron by an artificial synapse according to the second aspect of the invention.

A fourth aspect of the invention relates to a method for modulation by means of a modulation device according to the first aspect of the invention, the method comprising the following steps:
the control block carries out the first modification of the equivalent conductance $y_i(t)$ upon receipt of each clock signal;
the control block carries out the second modification of the equivalent conductance $y_i(t)$ upon receipt of each input voltage pulse.

A fifth aspect of the invention relates to a short term plasticity method in an artificial neural network according to the third aspect of the invention, the method comprising the following steps:

the control block carries out the first modification of the equivalent conductance $y_i(t)$ upon receipt of each clock signal;
the control block carries out the second modification of the equivalent conductance $y_i(t)$ upon receipt of each input voltage pulse emitted by the first artificial neuron.

The invention and its different applications will be better understood on reading the description that follows and by examining the figures that accompany it.

BRIEF DESCRIPTION OF THE FIGURES

The figures are presented for indicative purposes and in no way limit the invention.

FIG. 2a shows a particular implementation of the modulation device of FIG. 1a.

FIG. 4b shows a particular implementation of the artificial synapse of FIG. 2a.

FIG. 5b shows an example of connection of the first and second layers of the artificial neural network of FIG. 5a, by means of artificial synapses according to FIG. 2a.

DETAILED DESCRIPTION OF AT LEAST ONE EMBODIMENT OF THE INVENTION

Unless stated otherwise, a same element appearing in the different figures has a single reference.

Figure 1A:
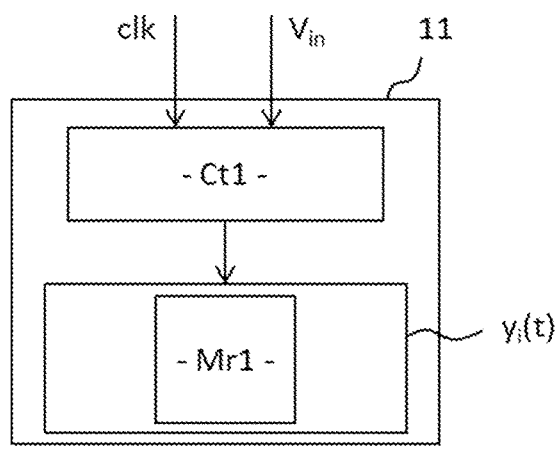
FIG. 1a shows a modulation device according to a first embodiment of the invention.
Figure 1B:
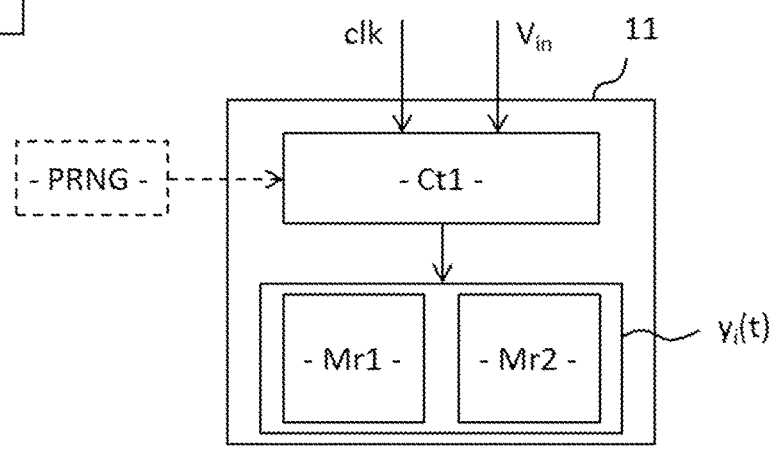
FIG. 1b shows a modulation device according to a second embodiment of the invention.

FIGS. 1a and 1b respectively show a modulation device 11 according to first and second embodiments. They are described jointly. The modulation device 11 according to any of the embodiments comprises a control block Ct1 able to:
receive a clock signal clk, and
receive an input voltage pulse $V_{in}$.

Unlike the input voltage pulse $V_{in}$, the clock signal clk has a fixed average frequency. The clock signal clk may be regular or random, for example according to a Poisson law.

The modulation device 11 according to any of the embodiments has an equivalent conductance $y_i(t)$. According to the first embodiment, the modulation device 11 comprises a single memristive device Mr1 and the equivalent conductance $y_i(t)$ is produced by this single memristive device Mr1. According to the first embodiment, the single memristive device Mr1 is preferentially of multivalued type, that is to say that it has at least three distinct resistive states. Within the scope of the present invention, the terms "multivalued" and "analogue" are indiscriminately employed. Such a multivalued device is for example a combination of two phase-change random access memories PCRAMs. According to the second embodiment, the modulation device 11 comprises first and second memristive devices Mr1, Mr2, that produce the equivalent conductance $y_i(t)$.

According to the second embodiment, each memristive device is preferentially of binary type, that is to say each only having two distinct resistive states. Such binary devices are for example OxRAM random access memories or CBRAM random access memories.

According to an alternative, not illustrated, the modulation device 11 could comprise three memristive devices or more, which would produce the equivalent conductance $y_i(t)$.

A memristive device is an electronic component with two terminals which behaves like a resistance or a conductance, the value of which changes dynamically with the application of a current or a voltage to its terminals. A device of this type may be characterised by the following equations:

$$i = G \cdot v$$
$$\frac{dG}{dt} = f(v, G)$$

where G is the conductance of the device which links its input current i to the voltage at its terminals v. Memristive devices are for example:
- RRAM (Resistive Random Access Memory) devices, among which CBRAM (Conductive-Bridging RAM) devices and OxRAM (Oxide resistive RAM) devices;
- PCRAM (Phase-Change RAM) devices;
- MRAM (Magnetic RAM) devices.

Each memristive device of the modulation device 11 is preferentially a CBRAM device or an OxRAM device.

According to any of the embodiments, the control block Ct1 is able to:
- carry out a first modification of the equivalent conductance $y_i(t)$ upon receipt of each clock signal clk, and
- carry out a second modification of the equivalent conductance $y_i(t)$ upon receipt of each input pulse $V_{in}$.

The first and second modifications are in opposite directions. Two particular cases are thus possible:
- either the first modification is an increase in the equivalent conductance and the second modification is a decrease in the equivalent conductance;
- or the first modification is a decrease in the equivalent conductance and the second modification is an increase in the equivalent conductance.

The first modification that takes place at each clock signal clk is preferentially strictly less, in absolute value, than the second modification which takes place at each input pulse $V_{in}$.

According to any of the embodiments, the control block Ct1 is advantageously able to:
- emit a pulse of a first type destined for each memristive device in order to carry out the first modification of the equivalent conductance $y_i(t)$, and
- emit a pulse of a second type destined for each memristive device in order to carry out the second modification of the equivalent conductance $y_i(t)$.

The control block Ct1 thereby only emits two distinct types of electrical programming pulses. Each first modification of the equivalent conductance $y_i(t)$ is obtained thanks to one or more pulses of the first type, and each second modification of the equivalent conductance $y_i(t)$ is obtained thanks to one or more pulses of the second type. Each pulse of the first type notably has a same first duration and a same first amplitude. Each pulse of the second type notably has a same second duration and a same second amplitude. This thereby enables the electronics associated with the control block Ct1 to be particularly simple.

According to the second embodiment, the control block Ct1 advantageously carries out the first and second modifications of the equivalent conductance $y_i(t)$ via an instruction that it receives from a pseudo random number generator PRNG. The means of the control block Ct1 for carrying out the first and second modifications of the equivalent conductance $y_i(t)$ thus advantageously include means for receiving an instruction from a pseudo random number generator PNRG. The control block Ct1 may comprise the pseudo random number generator PNRG, or instead the pseudo random number generator PNRG may be separate from the control block Ct1.

Figure 2A:
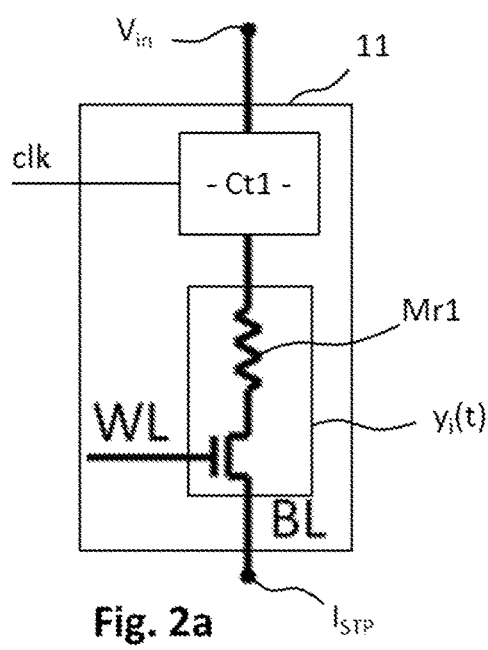

FIG. 2a shows an exemplary implementation of the modulation device 11 according to the first embodiment of the invention. According to this example, the modulation device 11 comprises a single memristive device Mr1 of multivalued type.

Figure 2B:
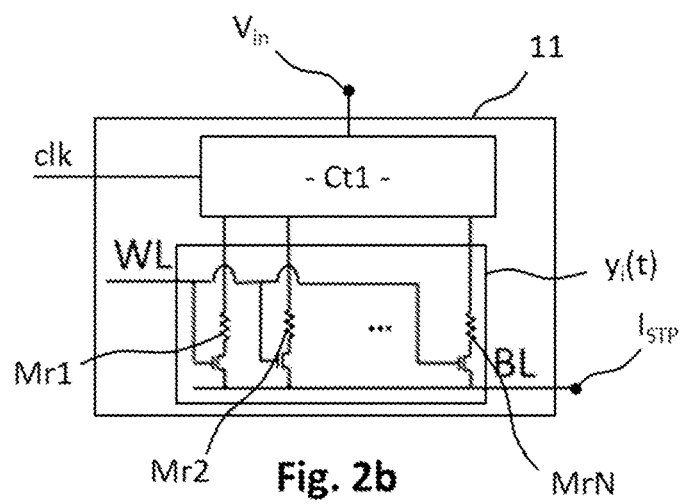
FIG. 2b shows a particular implementation of the modulation device of FIG. 1b.

FIG. 2b shows an exemplary implementation of the modulation device 11 according to the second embodiment of the invention. According to this example, the modulation device 11 comprises a plurality of memristive devices Mr1, Mr2, ..., MrN of binary type. Each binary resistive memory is typically arranged in series with a transistor. Alternatively, the modulation device 11 could comprise a plurality of memristive devices of multivalued type.

The modulation device 11 according to any of the embodiments has a first mode, designated "reading mode" and a second mode, designated "writing mode". The reading mode is a mode during which the equivalent conductance $y_i(t)$ cannot be modified, unlike the writing mode. When the control block Ct1 of the modulation device 11 receives a clock signal clk, it generates in writing mode at least one first writing voltage pulse that carries out the first modification of the equivalent conductance $y_i(t)$. When the control block Ct1 of the modulation device 11 receives an input voltage pulse $V_{in}$, it generates in reading mode a reading voltage pulse which propagates through each memristive device, and it generates in writing mode at least one second writing voltage pulse that carries out the second modification of the equivalent conductance $y_i(t)$.

Figure 3:
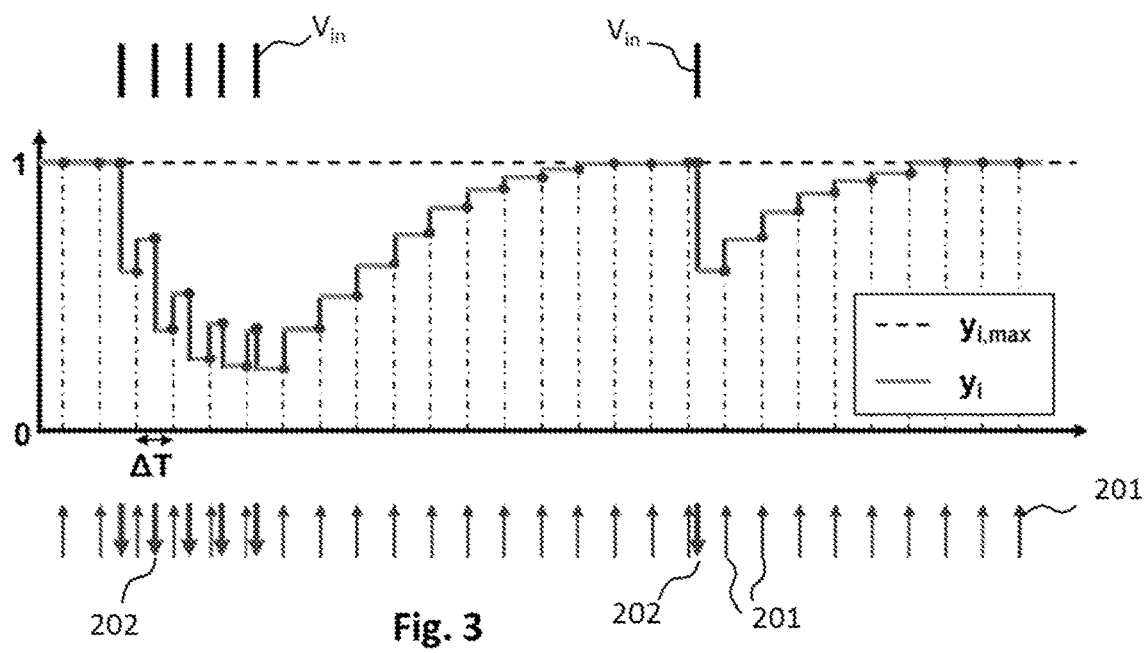
FIG. 3 illustrates a method for modulation by means of a modulation device according to one of the embodiments of the invention.

FIG. 3 illustrates a method for modulation by means of the modulation device 11 according to any of the embodiments, in the first particular case where:
- the first modification of the equivalent conductance $y_i(t)$, which is carried out upon receipt of each clock signal clk, is an increase in the equivalent conductance $y_i(t)$, and
- the second modification of the equivalent conductance $y_i(t)$, which is carried out upon receipt of each input voltage pulse $V_{in}$, is a decrease in the equivalent conductance $y_i(t)$.

In the absence of any input voltage pulse $V_{in}$, the equivalent conductance $y_i(t)$ of the modulation device 11 typically passes from its minimum value $y_{min}$ to its maximum value $y_{max}$ in a relaxation time proportional to $T_D$, thanks to the first writing voltage pulses 201 emitted upon receipt of each clock signal clk. Two consecutive clock signals are typically separated by a duration $\Delta T$. As soon as the modulation device 11 receives an input voltage pulse $V_{in}$, its equivalent conductance $y_i(t)$ decreases thanks to one or more second writing voltage pulses 202. The decrease in the equivalent conductance $y_i(t)$, and thus the characteristics of the second writing voltage pulse(s) 202, are a function of a reduction coefficient $f_D$ and of the relaxation time $\tau_d$. The reduction coefficient $f_D$ is such that: $0 < f_D < 1$. Each second writing voltage pulse 202 has a certain duration d202, and each first writing voltage pulse 201 has a certain duration d201, such that:

$$d201 < \tau_D$$

$$d202 < \tau_D$$

$$d201 < \Delta T < \tau_D$$

$$d202 < \Delta T < \tau_D$$

The duration $\Delta T$ may typically be of the order of the relaxation time $\tau_D$ divided by the number of resistive states of the modulation device 11.

When the modulation device 11 is produced from several memristive devices:
the reduction coefficient $f_D$ is typically defined by the probability of RESET $P_{RESET}$ of the modulation device 11, which is itself adjusted thanks to the amplitude of the second writing voltage pulses 202 or thanks to a pseudo random number generator PNRG;
the relaxation time $\tau_D$ is typically defined by the probability of SET $P_{SET}$ of the modulation device 11, which is itself adjusted thanks to the amplitude of the first writing voltage pulses 201 or thanks to a pseudo random number generator PNRG.

When the first resistive element 11 is produced from a single multivalued memristive device:
the reduction coefficient $f_D$ is typically defined by the amplitude and/or the duration d202 of the second writing voltage pulses 202;
the relaxation time $\tau_D$ is typically defined by the amplitude and/or the duration d201 of the first writing voltage pulses 201.

Figure 4A:
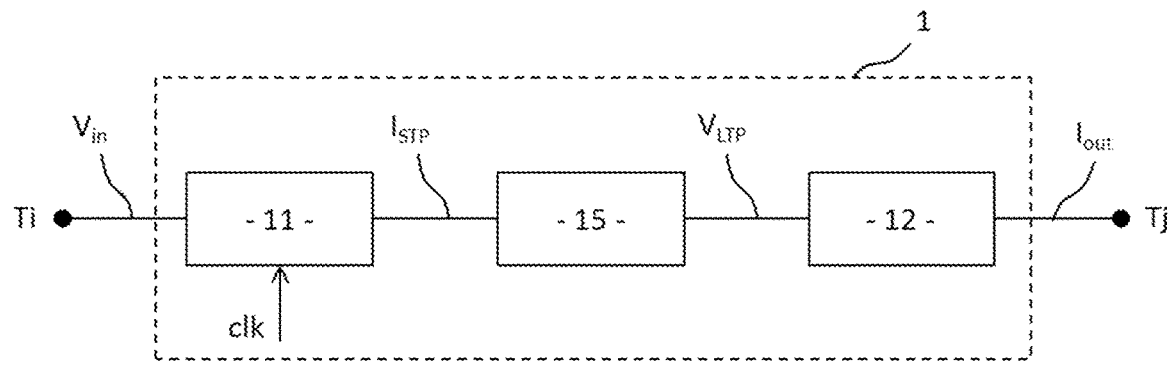
FIG. 4a shows an artificial synapse comprising a modulation device according to one of the embodiments of the invention as well as a second modulation device.

FIG. 4a shows an artificial synapse 1 comprising a modulation device 11 according to one of the first or second embodiments of the invention, and a second modulation device 12. The artificial synapse 1 has:
a first terminal Ti able to be connected to a first artificial neuron i, also called presynaptic neurone i or input neurone i, and
a second terminal Tj able to be connected to a second artificial neuron j, also called postsynaptic neuron j or output neurone j.

An artificial neuron is an active component, which is called:
"input neurone" or "presynaptic neurone" when it is connected downstream of an artificial synapse, and
"output neurone" or "postsynaptic neuron" when it is connected upstream of an artificial synapse.

Depending on the quantity of artificial synapses connected thereto and the layout thereof, an artificial neuron may have simultaneously one or more input neurone functions, and one or more output neurone functions. Alternatively, an artificial neuron may only have one or more input neurone functions, or one or more output neurone functions. The artificial neurons may be active or inactive: an artificial neuron is active when, at the considered instant, it emits a pulse. The duration of its "active" state may be predetermined.

The modulation device 11 can receive in input a clock signal clk on the one hand, and an input voltage pulse $V_{in}$, emitted by the presynaptic neurone i, on the other hand. The modulation device 11 can emit in output a current pulse $I_{STP}$, which is transmitted to the postsynaptic neuron j. Within the artificial synapse 1, the modulation device 11 advantageously carries out a short term plasticity STP mechanism, according to which the equivalent conductance $y_i(t)$ varies:
as a function of an activity of the presynaptic neurone i, that is to say as a function of the input voltage pulses $V_{in}$ emitted by the presynaptic neurone i, and
as a function of the clock signals regularly received.

The voltage pulses $V_{in}$ emitted by the presynaptic neurone i are also called "presynaptic pulses". The presynaptic pulses are typically all of same duration and of same amplitude.

The second modulation device 12 may receive in input a voltage pulse $V_{LTP}$, and emit in output a current pulse $I_{out}$. The second modulation device 12 has a variable equivalent conductance wy and advantageously carries out a long term plasticity LTP mechanism, according to which the second equivalent conductance wy varies as a function of an activity of the postsynaptic neuron j and a chronology between the activity of the postsynaptic neuron j and the activity of the presynaptic neurone i. In other words, the equivalent conductance $w_{ij}$ of the second modulation device 12 varies as a function of the voltage pulses emitted by the postsynaptic neuron j, also called "postsynaptic pulses", and as a function of the instants of emission of the postsynaptic pulses relative to the instants of emission of the presynaptic pulses. The postsynaptic pulses are typically all of same duration and of same amplitude.

The second modulation device 12 may comprise one or more binary type memristive devices, or alternatively one or more multivalued type memristive devices.

A current-voltage converter 15 connects the output of the modulation device 11 to the input of the second modulation device 12. The current-voltage converter 15 converts the current pulse $I_{STP}$ into the voltage pulse $V_{LTP}$.

Figure 4B:
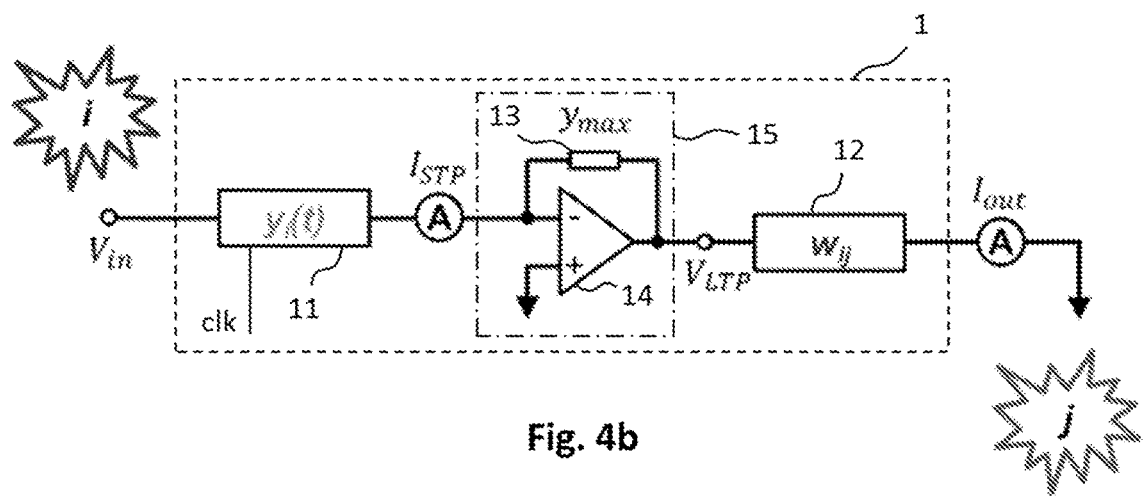

FIG. 4b shows a particular implementation of the current-voltage converter 15 of the artificial synapse 1, according to which the current-voltage converter 15 comprises:
a resistive element 13 of fixed conductance $y_{max}$, and
an operational amplifier 14.

The conductance $y_{max}$ of the resistive element 13 is preferentially substantially equal to the maximum conductance possible for the equivalent conductance $y_i(t)$ of the modulation device 11.

The operational amplifier 14 has a negative input branch, a positive input branch and an output branch. The positive input branch is connected to earth. The negative input branch is connected to the modulation device 11. The output branch is connected to the second modulation device 12. The negative input branch and the output branch are connected together via the resistive element 13.

The electric circuit of the artificial synapse 1 is thus such that a current $I_{out}(t)$ measured in output of the second modulation device 12 is expressed, as a function of a voltage $V_{LTP}(t)$ in input of the second resistive element 12:

$$I_{out}(t) = V_{LTP}(t) \times w_{ij}$$

The voltage $V_{LTP}(t)$ in input of the second resistive element 12 is expressed for its part as:

$$V_{LTP}(t) = -V_{in} \times \frac{y_i(t)}{y_{max}}$$

A modulation is obtained of the equivalent conductance wy of the second modulation device 12 by the equivalent conductance $y_i(t)$ of the modulation device 11. In other words, the artificial synapse 1 advantageously enables a modulation of a long term plasticity LTP mechanism by a short term plasticity STP mechanism.

The modulation device 11 and the second modulation device 12 of a same artificial synapse 1 preferentially both use a same memristive technology. For example, if the modulation device 11 uses memristive devices of CBRAM type, the memristive device(s) of the second modulation device 12 are also preferably of CBRAM type.

Figure 5A:
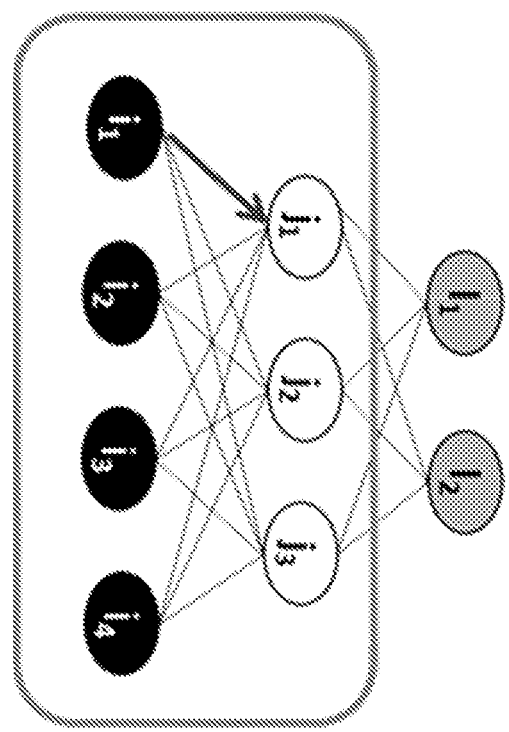
FIG. 5a shows a schematic representation of an artificial neural network comprising first, second and third layers of artificial neurons.

FIG. 5a schematically shows an artificial neural network, comprising:
- a first layer including artificial neurons $i_1$ to $i_4$,
- a second layer including artificial neurons $j_1$ to $j_3$ and
- a third layer including artificial neurons $l_1$ and $l_2$.

Each connection between two artificial neurons is produced by means of an artificial synapse 1, as described previously. Alternatively, only a part of the connections between artificial neurons could be made by means of artificial synapses 1.

In the example of FIG. 5a, each artificial neuron of the first layer is connected to all the artificial neurons of the second layer, and each artificial neuron of the second layer is connected to all the artificial neurons of the third layer. Alternatively, each artificial neuron of the first layer could only be connected to a part of the artificial neurons of the second layer and/or each artificial neuron of the second layer could only be connected to a part of the artificial neurons of the third layer. In the example of FIG. 5a, the network comprises three layers, but alternatively the network could only comprise two layers, or instead four layers or more. In the example of FIG. 5a, each layer comprises a plurality of artificial neurons, but alternatively at least one layer could only comprise a single artificial neuron.

Figure 5B:
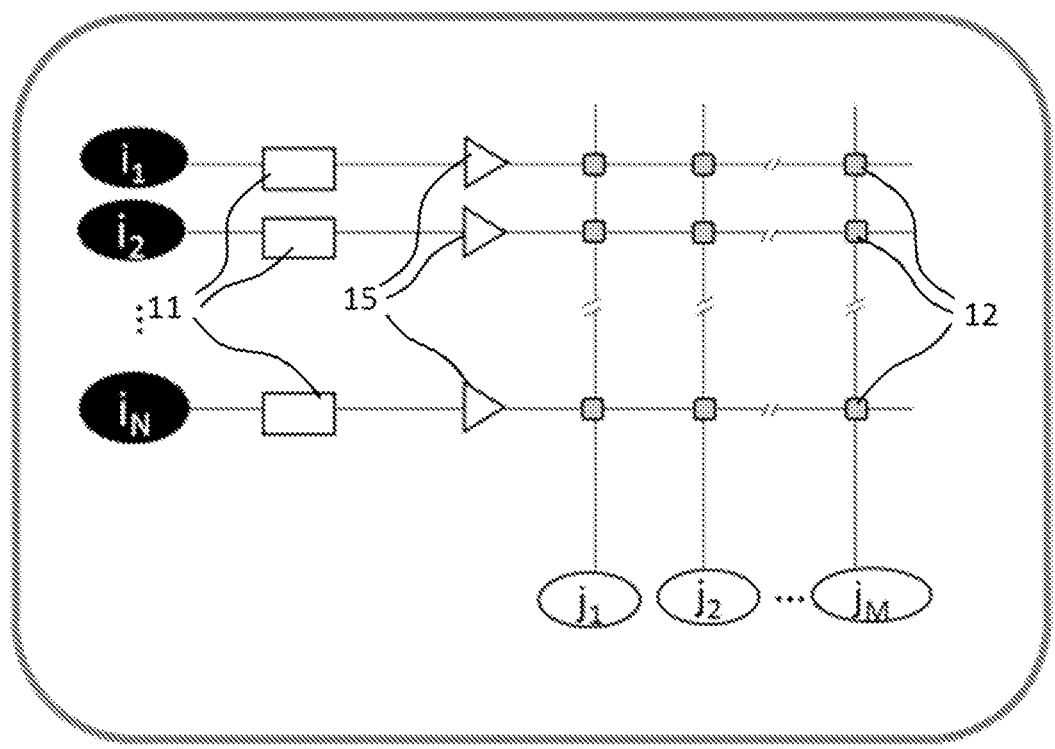

FIG. 5b shows in particular an example of electric circuit connecting each artificial neuron i of the first layer to each artificial neuron j of the second layer, by means of a plurality of artificial synapses 1 according to an aspect of the invention. In the example of FIG. 5b, the first layer comprises N artificial neurons i and the second layer comprises M artificial neurons j. The electric circuit comprises as many modulation devices 11 as artificial neurons i in the first layer, that is to say N modulation devices 11 in the example of FIG. 5b. The electric circuit comprises as many current-voltage converters 15 as modulation devices 11, that is to say N current-voltage converters 15 in the example of FIG. 5b. The electric circuit comprises as many second modulation devices 12 as synaptic connections, that is to say N×M second modulation devices 12 in the example of FIG. 5b where each artificial neuron i of the first layer is connected to each artificial neuron j of the second layer.

Each artificial neuron i of the first layer is thereby connected to each artificial neuron j of the second layer via an artificial synapse 1 comprising a modulation device 11, a current-voltage converter 15 and a second modulation device 12. Each modulation device 11 may be common to several artificial synapses 1: in the example of FIG. 5b, each modulation device 11 is common to M artificial synapses. On the other hand, each second modulation device 12 is specific to a single artificial synapse 1. In a matrix implementation such as that of FIG. 5b, a selection device (not represented) makes it possible to access individually each second modulation device 12.

The invention claimed is:

1. A modulation device for an artificial synapse connected to a first artificial neuron and a second artificial neuron of an artificial neural network, said first artificial neuron adapted to generate an input voltage pulse, said modulation device adapted to receive as separate inputs a clock signal and an input voltage pulse emitted by said first artificial neuron, the modulation device comprising:
at least one memristive device having two terminals and configured to operate as a conductance, a value of said conductance being changed with application of a current or a voltage to the two terminals, and
a control block,
the modulation device having an equivalent conductance $y_i(t)$ produced by the at least one memristive device and the control block having means for:
receiving a clock signal and carrying out a first modification of the equivalent conductance $y_i(t)$ upon receipt of each clock signal, the clock signal having a fixed average frequency, the means of the control block for carrying out the first modification of the equivalent conductance $y_i(t)$ include means for emitting a pulse of a first type destined for the at least one memristive device,
receiving an input voltage pulse and carrying out a second modification of the equivalent conductance $y_i(t)$ upon receipt of each input voltage pulse, the means of the control block for carrying out the second modification of the equivalent conductance $y_i(t)$ include means for emitting a pulse of a second type destined for the at least one memristive device,
the clock signal and input voltage pulse being separately received by respectively a first input and a second input of the control block to carry out, respectively,
the first and second modifications, the first and second modifications being in opposite directions.

2. The modulation device according to claim 1, wherein the first modification in absolute value is strictly less than the second modification in absolute value.

3. The modulation device according to claim 1, wherein the at least one memristive device is a CBRAM device or an OxRAM device.

4. The modulation device according to claim 1, comprising a plurality of memristive devices producing the equivalent conductance $y_i(t)$ and wherein the means of the control block for carrying out the first and second modifications of the equivalent conductance $y_i(t)$ include means for receiving an instruction from a pseudo random number generator.

5. The modulation device according to claim 1, comprising a plurality of memristive devices producing the equivalent conductance $y_i(t)$ and wherein the means of the control block for carrying out the first and second modifications of the equivalent conductance $y_i(t)$ include means for emitting pulses destined for the plurality of memristive devices in such a way that the plurality of memristive devices are placed in a particular operating mode in which they have an internal stochasticity, said pulses being determined by choosing a combination of the following parameters:
pulse width,
pulse rise and decay times,
pulse amplitude.

6. An artificial synapse comprising a modulation device according to claim 1.

7. An artificial neural network comprising at least one first artificial neuron able to emit an input voltage pulse and connected to a second artificial neuron by an artificial synapse according to claim 6.

8. A short term plasticity method in an artificial neural network according to claim 7, comprising:
carrying by the control block the first modification of the equivalent conductance $y_i(t)$ upon receipt of each clock signal;

carrying by the control block the second modification of the equivalent conductance $y_i$ upon receipt of each input voltage pulse emitted by the first artificial neuron.

9. A method for modulation by means of a modulation device according to claim 1, comprising:

carrying by the control block the first modification of the equivalent conductance $y_i(t)$ upon receipt of each clock signal;

carrying by the control block the second modification of the equivalent conductance $y_i(t)$ upon receipt of each input voltage pulse.

* * * * *